United States Patent
Shatunov et al.

(10) Patent No.: US 10,270,131 B2
(45) Date of Patent: Apr. 23, 2019

(54) ELECTROLYTE FOR LITHIUM BATTERY AND LITHIUM BATTERY INCLUDING THE SAME

(71) Applicant: SAMSUNG SDI CO., LTD., Yongin-si, Gyeonggi-do (KR)

(72) Inventors: Pavel Alexandrovich Shatunov, Yongin-si (KR); Olga Tsay, Yongin-si (KR); Aehui Goh, Yongin-si (KR); Aeran Kim, Yongin-si (KR); Miyoung Son, Yongin-si (KR); Woocheol Shin, Yongin-si (KR); Myungheui Woo, Yongin-si (KR); Seungtae Lee, Yongin-si (KR); Harim Lee, Yongin-si (KR); Hyunbong Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 230 days.

(21) Appl. No.: 15/442,837

(22) Filed: Feb. 27, 2017

(65) Prior Publication Data
US 2017/0250443 A1 Aug. 31, 2017

(30) Foreign Application Priority Data

Feb. 29, 2016 (KR) .................. 10-2016-0024716
Feb. 21, 2017 (KR) .................. 10-2017-0023191

(51) Int. Cl.
*H01M 10/0567* (2010.01)
*H01M 6/16* (2006.01)
(Continued)

(52) U.S. Cl.
CPC ....... *H01M 10/0567* (2013.01); *H01M 4/505* (2013.01); *H01M 4/525* (2013.01); (Continued)

(58) Field of Classification Search
None
See application file for complete search history.

(56) References Cited

U.S. PATENT DOCUMENTS 6,589,383 B1 * 7/2003 Takaoka ............... C08G 65/336 156/313
9,153,843 B2 10/2015 Saito et al.
(Continued)

FOREIGN PATENT DOCUMENTS

CN 107004902 A * 8/2017 ........ H01M 10/0567
JP 2001068115 A * 3/2001
(Continued)

OTHER PUBLICATIONS

CN107004902A translation (Year: 2015).*

*Primary Examiner* — Lucas J. O'Donnell
(74) *Attorney, Agent, or Firm* — Lee & Morse, P.C.

(57) ABSTRACT

An electrolyte for a lithium battery and a lithium battery including the electrolyte, the electrolyte including a compound represented by Formula 1 below:

<Formula 1>
$$OCN-\underset{R_2}{\overset{R_1}{Si}}-O-\underset{R_4}{\overset{R_3}{Si}}{\Large{)}}_n\!\!-NCO.$$

18 Claims, 6 Drawing Sheets

(51) Int. Cl.
  *H01M 10/0568* (2010.01)
  *H01M 10/0525* (2010.01)
  *H01M 10/0569* (2010.01)
  *H01M 4/505* (2010.01)
  *H01M 4/525* (2010.01)

(52) U.S. Cl.
  CPC ........... *H01M 6/164* (2013.01); *H01M 6/166* (2013.01); *H01M 6/168* (2013.01); *H01M 10/0525* (2013.01); *H01M 10/0568* (2013.01); *H01M 10/0569* (2013.01); *H01M 2220/30* (2013.01); *H01M 2300/0025* (2013.01)

(56)  References Cited

U.S. PATENT DOCUMENTS

| | | | |
|---|---|---|---|
| 2009/0311609 A1* | 12/2009 | Saisho | H01M 4/13 |
| | | | 429/337 |
| 2012/0244414 A1 | 9/2012 | Inagaki et al. | |
| 2012/0315536 A1 | 12/2012 | Bhat et al. | |
| 2014/0356735 A1* | 12/2014 | Pena Hueso | H01G 11/60 |
| | | | 429/339 |
| 2016/0351963 A1* | 12/2016 | Shatunov | H01M 10/0567 |
| 2017/0237117 A1* | 8/2017 | Johnson | H01M 10/0567 |
| | | | 429/188 |

FOREIGN PATENT DOCUMENTS

| | | |
|---|---|---|
| JP | 2012-134137 A | 7/2012 |
| JP | 2012-199145 A | 9/2012 |
| KR | 10-2011-0021662 A | 3/2011 |
| WO | WO 2006/137534 A1 | 12/2006 |

\* cited by examiner

ELECTROLYTE FOR LITHIUM BATTERY AND LITHIUM BATTERY INCLUDING THE SAME

CROSS-REFERENCE TO RELATED APPLICATION

Korean Patent Application No. 10-2016-0024716, filed on Feb. 29, 2016, in the Korean Intellectual Property Office and entitled: "Electrolyte for Lithium Battery and Lithium Battery Including the Same," and Korean Patent Application No. 10-2017-0023191, filed on Feb. 21, 2017, in the Korean Intellectual Property Office and entitled: "Electrolyte for Lithium Battery and Lithium Battery Including the Same," are incorporated by reference herein in their entirety.

BACKGROUND

1. Field

Embodiments relate to an electrolyte for a lithium battery and a lithium battery including the same.

2. Description of the Related Art

Lithium batteries may be used as driving power sources for portable electronic devices, including video cameras, mobile phones, notebook computers, and the like. Lithium secondary batteries are rechargeable at high rates and have an energy density per unit weight that is at least three times higher than that of existing lead storage batteries, nickel-cadmium batteries, nickel-hydrogen batteries, or nickel-zinc batteries.

Lithium batteries may operate at high operating voltages, and aqueous electrolytes highly reactive to lithium may not be suitable for use in such lithium batteries. Lithium batteries may use organic electrolytes. An organic electrolyte may be prepared by dissolving a lithium salt in an organic solvent.

SUMMARY

Embodiments are directed to an electrolyte for a lithium battery and a lithium battery including the same.

The embodiments may be realized by providing an electrolyte for a lithium battery, the electrolyte comprising a compound represented by Formula 1 below:

<Formula 1> wherein, in Formula 1, n is 0 or 1, when n=0, $R_2$ is a substituted or unsubstituted $C_2$-$C_{10}$ alkenyl group and $R_1$ is a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group; and when n=1, $R_1$ to $R_4$ are each independently a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group.

The compound of Formula 1 may be a compound represented by Formula 2 below:

<Formula 2> wherein, in Formula 2, $R_1$ may be a $C_1$-$C_5$ alkyl group.

The compound of Formula 1 may be a compound represented by Formula 3 or 4 below:

<Formula 3>

<Formula 4>

The compound of Formula 1 may be included in the electrolyte in an amount of about 0.001 wt % to about 10 wt %, based on a total weight of the electrolyte.

The compound of Formula 1 may be included in the electrolyte in an amount of about 0.05 wt % to about 0.2 wt %, based on a total weight of the electrolyte.

The electrolyte may further include an organic solvent, wherein the organic solvent includes a dialkyl carbonate, a cyclic carbonate, a linear or cyclic ester, a linear or cyclic amide, an aliphatic nitrile, or a linear or cyclic ether.

The electrolyte may further include a lithium salt, wherein the lithium salt is $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ in which x and y are each independently 1 to 20, LiCl, LiI, or a mixture thereof.

The embodiments may be realized by providing a lithium battery including a cathode; an anode; and an electrolyte, the electrolyte including a compound represented by Formula 1 below or a reaction product thereof:

<Formula 1> wherein, in Formula 1, n is 0 or 1, when n=0, $R_2$ is a substituted or unsubstituted $C_2$-$C_{10}$ alkenyl group and $R_1$ is a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group; and when n=1, each of $R_1$ to $R_4$ is independently a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group.

The cathode may include a lithium-nickel composite compound that contains nickel in an amount of about 50 mol % to about 100 mol %, based on a total weight of transition metals in the lithium-nickel composite compound.

The lithium-nickel composite compound may be represented by Formula 6 below:

<Formula 6> wherein, in Formula 6, x may be 0.9 to 1.2, y may be 0.5 to 1.0, and M may be cobalt (Co), manganese (Mn), or aluminum (Al).

The compound of Formula 6 may be a compound represented by Formula 7 below or a compound represented by Formula 8 below:

<Formula 7> wherein, in Formula 7, $1 \le x \le 1.2$, $0.5 \le y < 1$, $0 \le z \le 0.5$, and $0 \le 1-y-z \le 0.5$, <Formula 8> wherein, in Formula 8, $0.5 \le y \le 1$ and $0 \le z \le 0.5$.

The compound of Formula 6 may be $LiNi_{0.6}Co_{0.2}Mn_{0.2}O_2$, $LiNi_{0.88}Co_{0.1}Al_{0.02}O_2$, or a mixture thereof.

The compound of Formula 1 may be a compound represented by Formula 2 below:

<Formula 2> wherein, in Formula 2, $R_1$ may be a $C_1$-$C_5$ alkyl group.

The compound of Formula 1 may be a compound represented by Formula 3 or 4 below:

<Formula 3>

<Formula 4>

The compound of Formula 1 may be included in the electrolyte in an amount of about 0.001 wt % to about 10 wt %, based on a total weight of the electrolyte.

The compound of Formula 1 may be included in the electrolyte in an amount of about 0.05 wt % to about 0.2 wt %, based on a total weight of the electrolyte.

The electrolyte may further include an organic solvent, and the organic solvent may include a dialkyl carbonate, a cyclic carbonate, a linear or cyclic ester, a linear or cyclic amide, an aliphatic nitrile, or a linear or cyclic ether.

The electrolyte may further include a lithium salt, and the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ in which x and y are each independently 1 to 20, LiCl, LiI, or a mixture thereof.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Expressions such as "at least one of," when preceding a list of elements, modify the entire list of elements and do not modify the individual elements of the list. Herein, the term "or" is not an exclusive term.

Hereinafter, electrolytes for lithium batteries according to embodiments and lithium batteries including the same will be described in more detail.

An electrolyte for a lithium battery according to an embodiment may include a compound represented by Formula 1 below.

<Formula 1>

In Formula 1, n may be 0 or 1. In an implementation, when n=0, $R_2$ may be or may include, e.g., a substituted or unsubstituted $C_2$-$C_{10}$ alkenyl group and $R_1$ may be or may include, e.g., a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group.

In an implementation, when n=1, $R_1$ to $R_4$ may each independently be or include, e.g., a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group.

As noted above, when n=0, $R_2$ may be or may include, e.g., a substituted or unsubstituted $C_2$-$C_{10}$ alkenyl group. In an implementation, the alkenyl group may include, e.g., a vinyl group, an allyl group, or the like.

The compound of Formula 1 has an isocyanate (—N=C=O) group. This isocyanate functional group may be highly chemically reactive to a component (e.g., lithium alkoxide) existing on a solid electrolyte interface (SEI) layer of an anode or to a hydroxyl group (—OH) existing at a surface of a carbon-based anode or a silicon anode. Thus, when the compound of Formula 1 is included in an electrolyte, other side reactions may be suppressed and the compound of Formula 1 may act as a stabilizer for a SEI layer at a high temperature (e.g., about 45° C.). In addition, the isocyanate group of the compound of Formula 1 may form a donor-acceptor bond with a transition metal oxide of a cathode active material and may form a protective layer in the form of a complex. Accordingly, when the compound of Formula 1 is present at a surface of an electrode during initial charging of a lithium battery, a more stable inert layer may be formed at the surface of the electrode. Even when charging and discharging processes are repeated, such an inert layer may remain the same at a surface of an electrode, whereby stability of a lithium battery may be enhanced.

In an implementation, the compound of Formula 1 may be, e.g., a compound represented by Formula 2 below.

<Formula 2>

In Formula 2, $R_1$ may be, e.g., a $C_1$-$C_5$ alkyl group.

In an implementation, the compound of Formula 1 may be a compound represented by one of Formula 3 or 4 below.

<Formula 3>

<Formula 4>

Examples of substituents for the above alkyl, alkenyl, aryl and heteroaryl groups in Formula 1 above may include a halogen atom, a $C_1$-$C_{20}$ alkyl group substituted with a halogen atom (e.g., $CCF_3$, $CHCF_2$, $CH_2F$, $CCl_3$), a $C_1$-$C_{20}$ alkoxy group, a $C_2$-$C_{20}$ alkoxyalkyl group, a hydroxyl group, a nitro group, a cyano group, an amino group, an amidino group, hydrazine, hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, and a $C_6$-$C_{20}$ heteroarylalkyl group.

In an implementation, the compound of Formula 1 may be included in the electrolyte in an amount of about 0.001 wt % to about 10 wt %, e.g., about 0.005 wt % to about 5 wt % or about 0.05 wt % to about 0.2 wt %, based on a total weight of the electrolyte. When the amount of the compound of Formula 1 in the electrolyte is within the above ranges, a battery with enhanced lifespan characteristics and high-temperature charging and discharging characteristics may be obtained.

According to an embodiment, the electrolyte may exhibit excellent lifespan characteristics at room temperature and at high temperature at a high operating voltage of 4.2 V or higher.

A lithium battery according to another embodiment may include, e.g., a cathode, an anode, and at least one selected from the electrolyte described above and a reaction product thereof.

When the electrolyte includes the compound of Formula 3 above, the term "reaction product" as used herein may refer a product of a reaction (e.g., polymerization) between unsaturated bonds, e.g., carbon-carbon double bonds of the compound of Formula 1 or 3 above included in the electrolyte, in which the reaction occurs during operating of a battery. Also, the term "reaction product" of the electrolyte as used herein may be interpreted as including a decomposition product of the electrolyte after operation of a battery, a reaction product of the electrode or SEI layer with the compound represented by Formula 1 or other component(s) of the electrolyte, a reaction product of the compound represented by Formula 1 with other component(s) of the electrolyte or battery during or after initial operation of the battery, or the like.

The cathode may include a nickel (Ni)-containing composite compound (e.g., containing Ni in an amount of about 50 mol % to about 100 mol % based on the total amount of transition metals). In an implementation, a lithium-nickel composite compound containing about 50 mol % to about 100 mol % of Ni may be a compound represented by Formula 6 below <Formula 6>

In Formula 6, x may be 0.9 to 1.2, y may be 0.5 to 1.0, and M may be cobalt (Co), manganese (Mn), or aluminum (Al).

The compound of Formula 6 may be, e.g., a compound represented by one of Formula 7 or 8 below.

<Formula 7>

In Formula 7, 1≤x≤1.2, 0.5≤y<1, 0≤z≤0.5, and 0≤1-y-z≤0.5.

<Formula 8>

In Formula 8, 0.5≤y≤1 and 0≤z≤0.5.

In an implementation, the compound of Formula 7 and the compound of Formula 8 may be used in combination as a cathode active material. For example, when the compounds of Formulae 7 and 8 are used in combination, a lithium secondary battery may have enhanced initial capacity.

When the compound of Formula 7 and the compound of Formula 8 are used in combination, the amount of the compound of Formula 7 may be from about 30 parts by weight to about 80 parts by weight based on the total weight (100 parts by weight) of the compounds of Formulae 7 and 8.

In the lithium battery, the cathode may include a nickel-rich lithium-nickel composite oxide containing nickel in an amount of, e.g., about 50 mol % to about 100 mol % or about 80 mol % to about 100 mol %. When the content of nickel is within the range described above, a high-output and high-capacity lithium battery may be manufactured. When the content of nickel is as high as the range described above, elution of transition metals of the nickel-rich lithium-nickel composite oxide could severely occurs and thus high-temperature characteristics could deteriorate. When the electrolyte according to one of the embodiments is used, however, the elution of transition metals of the cathode may decrease. In addition, the electrolyte may have polymer film effects at the cathode and thus damage to the cathode due to by-products may be decreased. As such, by including the aforementioned compound in the electrolyte, the deterioration of high-temperature characteristics, may be prevented and thus a high-output and high-capacity lithium battery with, at a high temperature, long lifespan and strong effects of suppressing an increase in resistance may be manufactured. When the content of nickel is within the above range, the lithium battery may exhibit long lifespan and strong effects of suppressing an increase in resistance, at a high temperature.

When both the nickel-rich lithium-nickel composite oxide and the electrolyte are used, the lithium battery may exhibit very long lifespan and very strong effects of suppressing an increase in resistance, at a high temperature.

In an implementation, the compound of Formula 6 above is $LiNi_{0.6}Co_{0.2}Mn_{0.2}O_2$ or $LiNi_{0.88}Co_{0.1}Al_{0.02}O_2$. In an implementation, a mixture of $LiNi_{0.6}Co_{0.2}Mn_{0.2}O_2$ and $LiNi_{0.88}Co_{0.1}Al_{0.02}O_2$ in a weight ratio of 7:3, 6:4, or 8:2 may be used as a cathode active material.

An organic solvent of the electrolyte may include a low boiling point solvent. The term "low boiling point solvent" as used herein may refer a solvent having a boiling point of 200° C. or less at 1 atm.

In an implementation, the organic solvent may include e.g., a dialkyl carbonate, a cyclic carbonate, a linear or cyclic ester, a linear or cyclic amide, an aliphatic nitrile, a linear or cyclic ether, or derivatives thereof.

In an implementation, the organic solvent may include e.g., dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, ethyl propionate, ethyl butyrate, acetonitrile, succinonitrile (SN), dimethyl sulfoxide, dimethylformamide, dimethylacetamide, γ-valerolactone, γ-butyrolactone, or tetrahydrofuran. In an implementation, the organic solvent may include e.g., a suitable low boiling point solvent.

In an implementation, a concentration of the lithium salt in the electrolyte may be, e.g., about 0.01 M to about 2.0 M. In an implementation, an appropriate concentration of the lithium salt may be used. Within the concentration range described above, enhanced battery characteristics may be achieved.

In an implementation, the lithium salt used in the electrolyte may include, e.g., $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ in which x and y are each independently 1 to 20, LiCl, LiI, a mixture thereof, or the like. For example, the lithium salt of the electrolyte may be $LiPF_6$.

The electrolyte may be in a liquid or gel state.

Examples of types of batteries may include lithium secondary batteries such as a lithium ion battery, a lithium ion polymer battery, a lithium sulfur battery, and the like, and lithium primary batteries.

In the lithium battery, graphite or silicon-carbon composite/graphite may be used as an anode active material. The lithium battery may have a high voltage of 4.5 V or more, e.g., 4.8 V or more.

A lithium battery according to one embodiment may be manufactured using the following method.

First, a cathode may be prepared.

For example, a cathode active material composition, in which a cathode active material, a conductive agent, a binder, and a solvent are mixed, may be prepared. The cathode active material composition may be directly coated on a metal current collector to manufacture a cathode plate. In an implementation, the cathode active material composition may be cast on a separate support and then a film separated from the support may be laminated on a metal current collector, thereby completing the manufacture of a cathode. In an implementation, the cathode may be manufactured using suitable methods.

As the cathode active material, the nickel-rich lithium-nickel composite oxide described above may be used in combination with a suitable lithium-containing metal oxide. The lithium-containing metal oxide may include, e.g., a composite oxide of lithium and cobalt, manganese, nickel, or combinations thereof. For example, the lithium-containing metal oxide may be a compound represented by any one of Formulae: $Li_aA_{1-b}B'_bD_2$ where $0.90 \leq a \leq 1.8$ and $0 \leq b \leq 0.5$; $Li_aE_{1-b}B'_bO_{2-c}D_c$ where $0.90 \leq a \leq 1.8$, $0 \leq b \leq 0.5$, and $0 \leq c \leq 0.05$; $LiE_{2-b}B'_bO_{4-c}D_c$ where $0 \leq b \leq 0.5$ and $0 \leq c \leq 0.05$; $Li_aNi_{1-b-c}Co_bB'_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB'_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bB'_cO_{2-\alpha}F'_2$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB'_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cO_{2-\alpha}F'_2$ where $0.90 \leq a \leq 1.8$, $0 \leq b \leq 0.5$, $0 \leq c \leq 0.05$, and $0 < \alpha < 2$; $Li_aN i_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A may be nickel (Ni), cobalt (Co), manganese (Mn), or a combination thereof; B' may be aluminum (Al), Ni, Co, Mn, chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be Co, Mn, or a combination thereof; F' may be F, S, P, or a combination thereof; G may be Al, Cr, Mn, Fe, Mg, lanthanum (La), cerium (Ce), strontium (Sr), V, or a combination thereof; Q may be titanium (Ti), molybdenum (Mo), Mn, or a combination thereof; I' may be Cr, V, Fe, scandium (Sc), yttrium (Y), or a combination thereof; and J may be V, Cr, Mn, Co, Ni, copper (Cu), or a combination thereof.

For example, the cathode active material may be $LiCoO_2$, $LiMn_xO_{2x}$ where x=1 or 2, $LiNi_{1-x}Mn_xO_{2x}$ where $0<x<1$, $LiNi_{1-x-y}Co_xMn_yO_2$ where $0≤x≤0.5$, $0≤y≤0.5$, and $1-x-y>0.5$, $LiFePO_4$, or the like.

In an implementation, the compounds described above may have a coating layer at their surfaces. In an implementation, the compounds may be used in combination with a compound having a coating layer. The coating layer may include a coating element compound, e.g., an oxide of a coating element, a hydroxide of a coating element, an oxyhydroxide of a coating element, an oxycarbonate of a coating element, or a hydroxycarbonate of a coating element. The compounds constituting coating layers may be amorphous or crystalline. The coating element included in the coating layer may be Mg, Al, Co, K, Na, Ca, Si, Ti, V, Sn, Ge, Ga, B, As, Zr, or a mixture thereof. A coating layer may be formed by using the coating elements in the aforementioned compounds by using any one of various suitable methods that do not adversely affect physical properties of the cathode active material (e.g., spray coating, immersion, or the like).

In an implementation, the conductive agent may include, e.g., carbon black, graphite particulates, or the like. In an implementation, the conductive agent may include a suitable conductive agent.

Examples of the binder may include a vinylidene fluoride/hexafluoropropylene copolymer, polyvinylidene fluoride (PVDF), polyacrylonitrile, polymethyl methacrylate, polytetrafluoroethylene, a mixture of the aforementioned polymers, and a styrene butadiene rubber-based polymer. In an implementation, the binder may include a suitable binder.

The solvent may include, e.g., N-methylpyrrolidone, acetone, water, or the like. In an implementation, the solvent may include a suitable solvent.

The amounts of the cathode active material, the conductive agent, the binder, and the solvent may be the same level as those suitably used in a lithium battery. In an implementation, at least one of the conductive agent, the binder, and the solvent may be omitted according to the use and constitution of desired lithium batteries.

Next, an anode may be prepared.

For example, an anode active material composition may be prepared by mixing an anode active material, a conductive agent, a binder, and a solvent. The anode active material composition may be directly coated on a metal current collector and dried to obtain an anode plate. In an implementation, the anode active material composition may be cast on a separate support and a film separated from the support may be laminated on a metal current collector to complete the fabrication of an anode plate.

As the anode active material, a suitable anode active material of lithium batteries may be used. For example, the anode active material may include lithium metal, a metal alloyable with lithium, a transition metal oxide, a non-transition metal oxide, or a carbonaceous material.

For example, the metal alloyable with lithium may include silicon (Si), tin (Sn), aluminum (Al), germanium (Ge), lead (Pb), bismuth (Bi), antimony (Sb), a Si-yttrium (Y') alloy (Y' is an alkali metal, an alkali earth metal, Group 13 and 14 elements, a transition metal, a rare earth element, or a combination thereof except for Si), a Sn—Y' alloy (Y' is an alkali metal, an alkali earth metal, Group 13 and 14 elements, a transition metal, a rare earth element, or a combination thereof except for Sn), or the like. Examples of Y' may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and combinations thereof.

For example, the transition metal oxide may be lithium titanate oxide, vanadium oxide, lithium vanadium oxide, or the like.

For example, the non-transition metal oxide may be $SnO_2$, $SiO_x$ where $0<x<2$, or the like.

The carbonaceous material may include crystalline carbon, amorphous carbon, or a mixture thereof. Examples of the crystalline carbon may include natural graphite and artificial graphite, each of which has an irregular form or is in the form of a plate, a flake, a sphere, or a fiber. Examples of the amorphous carbon may include soft carbon (low-temperature calcined carbon), hard carbon, mesophase pitch carbonized product, and calcined coke.

In the anode active material composition, a conductive agent and a binder that are the same as those used in the cathode active material composition may be used.

The amounts of the anode active material, the conductive agent, the binder, and the solvent may be the same level as those suitably used in a lithium battery. At least one of the conductive agent, the binder, and the solvent may be omitted according to the use and constitution of desired lithium batteries.

Next, a separator to be disposed between the cathode and the anode may be prepared.

A suitable separator for lithium batteries may be used. As the separator, a separator having low resistance to transfer of ions in an electrolyte and high electrolyte-retaining ability may be used. Examples of the separator may include glass fiber, polyester, Teflon, polyethylene, polypropylene, polytetrafluoroethylene (PTFE), and combinations thereof, each of which may be a non-woven fabric or a woven fabric. For example, a windable separator formed of polyethylene, polypropylene, or the like may be used in lithium ion batteries, and a separator having a high electrolyte-retaining ability may be used in lithium ion polymer batteries. For example, the separator may be manufactured according to the following method.

A separator composition may be prepared by mixing a polymer resin, a filler, and a solvent. The separator composition may be directly coated on an upper portion of an electrode and dried, thereby completing the manufacture of a separator. In an implementation, the separator composition may be cast on a support and dried and a separator film separated from the support may be laminated on an upper portion of an electrode, thereby completing the manufacture of a separator.

The polymer resin used in the manufacture of the separator may include suitable materials used in binders of electrode plates. For example, the polymer resin may be a vinylidene fluoride/hexafluoropropylene copolymer, PVDF, polyacrylonitrile, polymethyl methacrylate, a mixture thereof, or the like.

Next, the electrolyte described above may be prepared.

Figure 1:
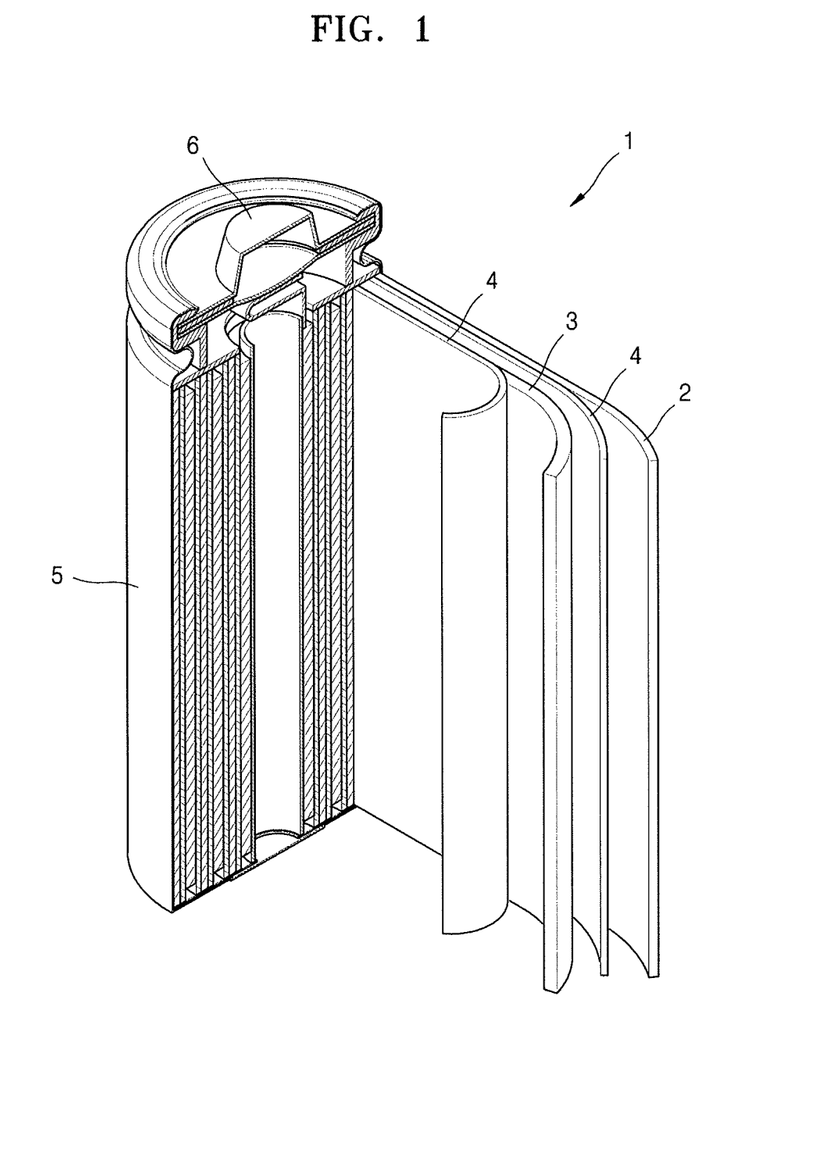
FIG. 1 illustrates an exploded perspective view of a lithium battery according to an embodiment.

As illustrated in FIG. 1, a lithium battery 1 may include a cathode 3, an anode 2, and a separator 4. The cathode 3, the anode 2, and the separator 4 may be wound or folded and, thereafter, accommodated in a battery case 5. Subsequently, the electrolyte may be injected into the battery case 5 and the battery case 5 is sealed with a cap assembly 6, thereby completing the manufacture of the lithium battery 1. The battery case 5 may have, e.g., a cylindrical, rectangular, or thin film shape. For example, the lithium battery may be a large-sized thin film-type battery. For example, the lithium battery may be a lithium ion battery.

The separator may be disposed between the cathode and the anode to form a battery assembly. A plurality of battery assemblies may be stacked in a bi-cell structure and impregnated into the electrolyte, the resultant is put into a pouch and hermetically sealed, thereby completing the manufacture of a lithium ion polymer battery.

In an implementation, the battery assemblies may be stacked to form a battery pack, and such a battery pack may be used in any devices requiring high capacity and high-power output. For example, the battery pack may be used in notebook computers, smart phones, electric vehicles, and the like.

In addition, the lithium battery may have excellent lifespan characteristics and high rate characteristics and thus may be used in electric vehicles (EVs). For example, the lithium battery may be used in hybrid vehicles such as a plug-in hybrid electric vehicle (PHEV) or the like. The lithium battery may also be used in fields requiring the storage of a large amount of power. For example, the lithium battery may be used in electric bikes, motor-driven tools, and the like.

The term "alkyl" used herein refers to a fully saturated branched or non-branched (straight chain or linear) hydrocarbon.

Non-limiting examples of "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of "alkyl" may be substituted with a halogen atom, a $C_1$-$C_{20}$ alkyl group substituted with a halogen atom (e.g., $CCF_3$, $CHCF_2$, $CH_2F$, $CCl_3$, or the like), a $C_1$-$C_{20}$ alkoxy group, a $C_2$-$C_{20}$ alkoxy alkyl group, a hydroxyl group, a nitro group, a cyano group, an amino group, an amidino group, hydrazine, hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

The term "halogen" as used herein includes fluorine, bromine, chlorine, iodine, and the like.

The term "aryl" used herein also refers to a group in which an aromatic ring is fused to at least one carbon ring. Non-limiting examples of "aryl" include phenyl, naphthyl, and tetrahydronaphthyl.

In addition, at least one hydrogen atom of the aryl group may be substituted with the same substituent as in the alkyl group described above.

The term "heteroaryl" as used herein refers to a monocyclic or bicyclic organic compound which contains at least one heteroatom selected from N, O, P, and S and has carbon atoms as the remaining ring atoms. The heteroaryl group may contain, for example, 1 to 5 heteroatoms and 5 to 10 ring members. The S or N group may have various oxidation states through oxidation.

Examples of the heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazine-2-yl, pyrazine-4-yl, pyrazine-5-yl, 2-pyrimidine-2-yl, 4-pyrimidine-2-yl, and 5-pyrimidine-2-yl.

The term "heteroaryl" as used herein includes a case in which a hetero aromatic ring is fused to at least one of aryl, cycloaliphatic and heterocyclic groups.

The electrolyte and the lithium battery will now be described in further detail with reference to the following examples and comparative examples. These examples are for illustrative purposes only and are not intended to limit the scope of the examples.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of Electrolyte

First, 0.05 wt % of a compound represented by Formula 3 below was added to a mixed solvent of ethylene carbonate (EC), ethyl methyl carbonate (EMC), and dimethyl carbonate (DMC) in a volume ratio of 2:1:7, and then a sufficient amount to finally prepare a 1.5 M solution of $LiPF_6$ as a lithium salt was added to the resulting solution and dissolved therein, thereby completing the preparation of an electrolyte.

<Formula 3>

Example 2: Preparation of Electrolyte

An electrolyte was prepared in the same manner as in Example 1, except that a compound represented by Formula 4 was used instead of the compound of Formula 3.

<Formula 4>

Examples 3 and 4: Preparation of Electrolytes

Electrolytes were prepared in the same manner as in Example 1, except that the amounts of the compound of Formula 3 were 0.1 wt % and 0.2 wt %, respectively, in the preparation of the electrolyte.

Examples 5 and 6: Preparation of Electrolytes

Electrolytes were prepared in the same manner as in Example 2, except that the amounts of the compound of Formula 4 were 0.1 wt % and 0.2 wt %, respectively, in the preparation of the electrolyte.

Comparative Example 1: Preparation of Electrolyte

An electrolyte was prepared in the same manner as in Example 1, except that the compound of Formula 3 was omitted.

Manufacture Example 1: Manufacture of Lithium Ion Battery

An anode was manufactured using the following processes.

97 wt % of silicon carbon composite/graphite (11 wt % of silicon carbon composite and 89 wt % of graphite), 1.5 wt % of BM408 (manufactured by Daicel) as a conductive agent, and 1.5 wt % of BM400-B (manufactured by Zeon) as a binder were mixed, the mixture was added to distilled water, and the resulting mixture was stirred using a mechanical stirrer for 60 minutes to prepare an anode active material slurry. The anode active material slurry was coated, using a doctor blade, on a copper (Cu) current collector having a thickness of 10 μm to a thickness of about 60 μm, and the coated current collector was dried in a hot-air dryer at 100° C. for 0.5 hours, followed by further drying under conditions: under vacuum at 120° C. for 4 hours, and roll-pressed, thereby completing the fabrication of an anode. The anode had a mixed density of 1.55 g/cc and a loading level (L/L) of 14.36 mg/cm$^2$.

Separately, a cathode was manufactured according to the following processes.

94 wt % of a mixture of $LiNi_{0.6}Co_{0.2}Mn_{0.2}O_2$ (NCM 622 manufactured by Samsung SDI) and $LiNi_{0.88}Co_{0.1}Al_{0.02}O_2$ in a weight ratio of 7:3, 3.0 wt % of Denka black as a conductive agent, and 3.0 wt % of PVDF as a binder (Solef 6020 manufactured by Solvay) were mixed, the mixture was added to N-methyl-2-pyrrolidone as a solvent, and the resultant mixture was stirred using a mechanical stirrer for 30 minutes to prepare a cathode active material slurry. The cathode active material slurry was coated, using a doctor blade, on an aluminum (Al) current collector having a thickness of 20 μm to a thickness of about 60 μm, and the coated current collector was dried in a hot-air dryer at 100° C. for 0.5 hours, followed by further drying under conditions: under vacuum at 120° C. for 4 hours, and roll-pressed, thereby completing the fabrication of a cathode. The cathode had a mixed density of 3.15 g/cc and a loading level (L/L) of 27.05 mg/cm$^2$.

A lithium battery (2016 full battery) was manufactured using a polyethylene separator having a thickness of 16 μm (manufactured by SK Innovation) and the electrolyte prepared according to Example 1.

Manufacture Examples 2 to 6

Lithium batteries were manufactured in the same manner as in Manufacture Example 1, except that the respective electrolytes prepared according to Examples 2 to 6 were used instead of the electrolyte of Example 1.

Comparative Manufacture Example 1: Manufacture of Lithium Battery

A lithium battery was manufactured in the same manner as in Manufacture Example 1, except that the electrolyte prepared according to Comparative Example 1 was used instead of the electrolyte of Example 1.

Evaluation Example 1: High-Voltage (4.2 V), High-Temperature (45° C.) Charge and Discharge Characteristics

Manufacture Examples 1 and 2 and Comparative Manufacture Example 1

Each of the lithium batteries manufactured according to Manufacture Examples 1, 3, and 4 and Comparative Manufacture Example 1 was charged with a constant current of 0.2 C rate at 45° C. until the voltage reached 4.20 V (vs. Li) and then, while maintaining a constant voltage of 4.20 V, the charging process was cut off at a current of 0.05 C rate. Subsequently, each lithium battery was discharged with a constant current of 0.2 C rate until the voltage reached 2.5 V (vs. Li) (formation operation, 1$^{st}$ cycle).

Each lithium battery having gone through the formation operation (1$^{st}$ cycle) was charged with a constant current of 0.2 C rate at 45° C. until the voltage reached 4.20 V (vs. Li) and then, while maintaining a constant voltage of 4.20 V, the charging process was cut off at a current of 0.05 C rate. Subsequently, each lithium battery was discharged with a constant current of 0.2 C rate until the voltage reached 2.5 V (vs. Li) (formation operation, 2$^{nd}$ cycle).

Each resultant lithium battery was charged with a constant current of 1.6 C rate at 45° C. until the voltage reached 4.20 V (vs. Li) and then, while maintaining a constant voltage of 4.20 V, the charging process was cut off at a current of 0.2 C rate. Subsequently, each lithium battery was discharged with a constant current of 1.6 C rate until the voltage reached 2.0 V (vs. Li) and this cycle of charging and discharging was repeated 100 times.

In all the cycles of charging and discharging, there was a rest period of 10 minutes at the end of each cycle.

Figure 2A:
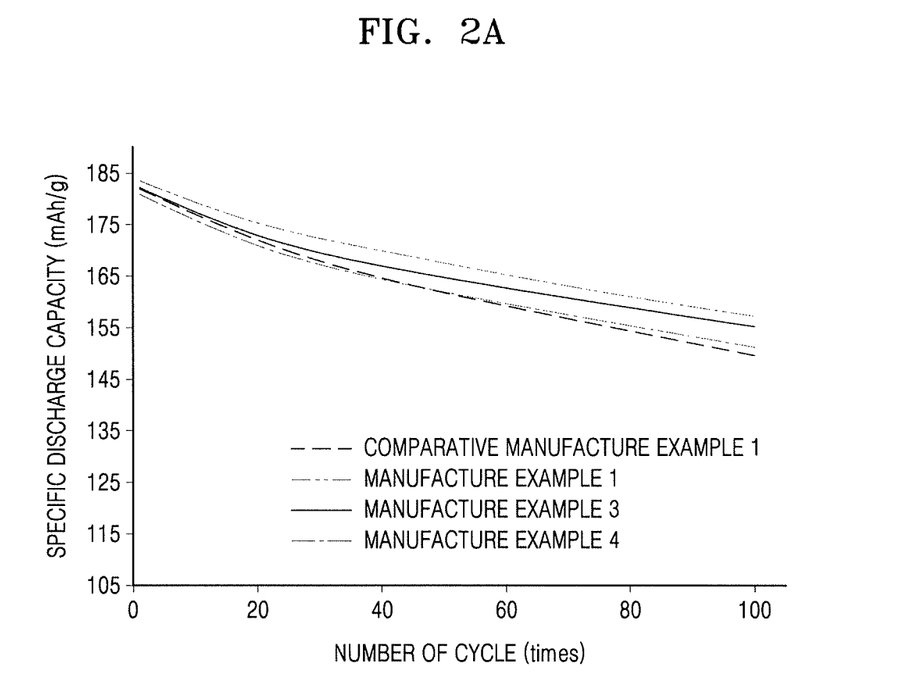
FIG. 2A illustrates a graph showing lifespan characteristics of lithium batteries manufactured according to Manufacture Examples 1, 3, and 4 and Comparative Manufacture Example 1.

A part of charging and discharging experiment results is shown in FIG. 2A.

Referring to FIG. 2A, it may be seen that the lithium batteries of Manufacture Examples 1, 3, and 4 had better high-temperature lifespan characteristics than those of the lithium battery of Comparative Manufacture Example 1.

Charge and discharge characteristics at 45° C. of the lithium batteries manufactured according to Manufacture Examples 2, 5, and 6 were evaluated using the same method as that used in the high-temperature charge and discharge characteristics of the lithium battery of Manufacture Example 1. A part of charging and discharging experiment results is shown in FIG. 2B.

Figure 2B:
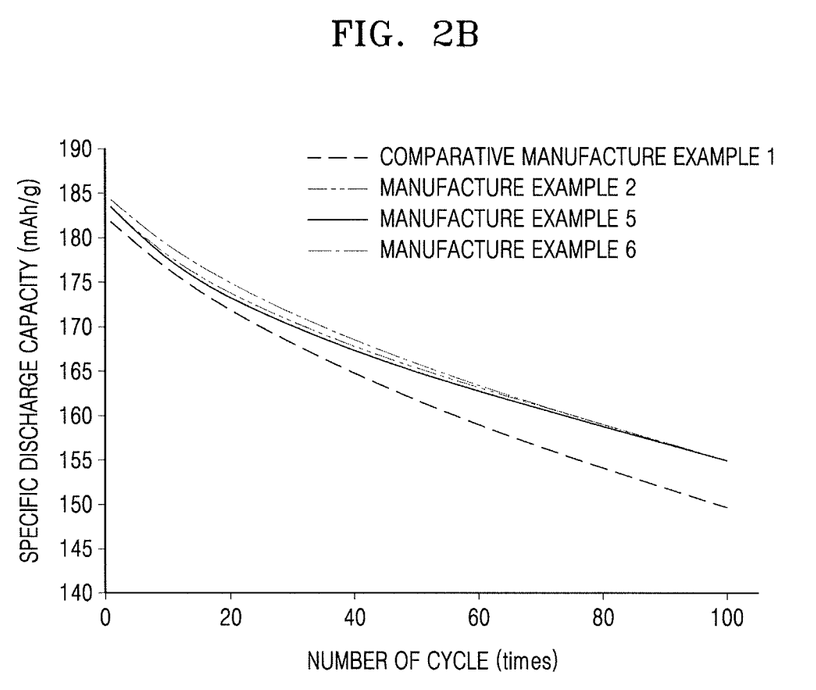
FIG. 2B illustrates a graph showing lifespan characteristics of lithium batteries manufactured according to Manufacture Examples 2, 5 and 6 and Comparative Manufacture Example 1.

Referring to FIG. 2B, the lithium batteries of Manufacture Examples 2, 5 and 6 exhibited high-temperature charge and discharge characteristics similar to those of the lithium battery of Manufacture Example 1.

Evaluation Example 2: Electrochemical Stability (Linear Sweep Voltammetry (LSV) for Cathode)

Electrochemical stability of each of the electrolytes prepared according to Example 1 and Comparative Example 1 was evaluated using the following method. First, to perform LSV on a cathode, a platinum (Pt) electrode as a working electrode (W.E.), a lithium (Li) metal as a counter electrode (CE), and a Li metal as a reference electrode (R.E.) were used and each of the electrolytes of Example 1 and Comparative Example 1 was injected thereinto, thereby completing the manufacture of a three-electrode system cell. The electrochemical stability was measured by LSV at a scan rate of 5 mV/s by 6 V.

As a result of electrochemical stability evaluation, significant decomposition of the electrolyte of Example 1 was not observed, as compared to the electrolyte of Comparative Example 1, from which it may be seen that the electrolyte of Example 1 had high oxidative decomposition stability at a cathode. From the result, it may be seen that the compound of Formula 3 served as a stable electrolyte additive at a cathode.

Evaluation Example 3: Electrochemical Stability (Cyclic Voltammetry (CV) for Anode)

Figure 3A:
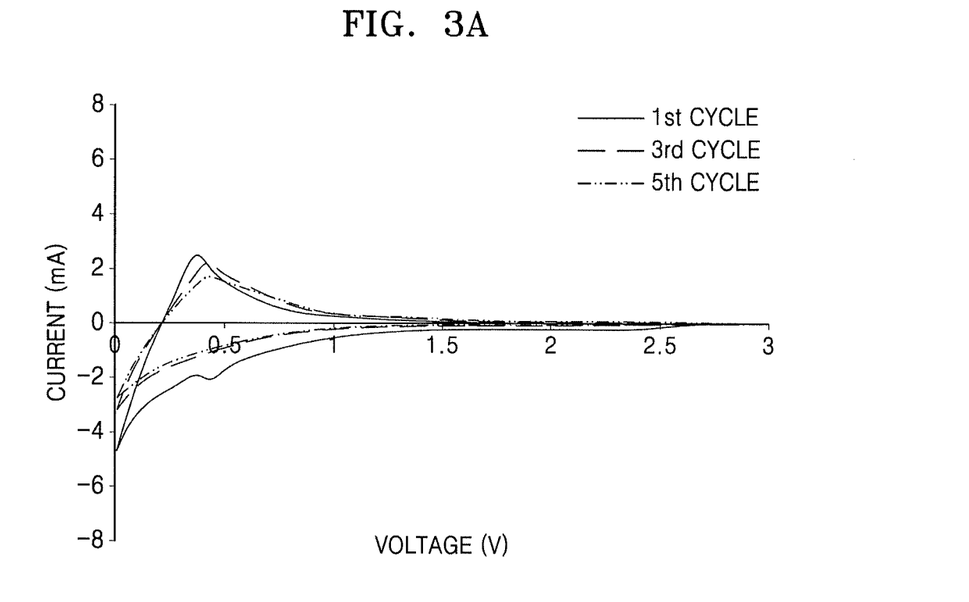
FIGS. 3A and 3B illustrate graphs showing cyclic voltammetry (CV) analysis results of an anode using an electrolyte prepared according to Example 1.
Figure 3B:
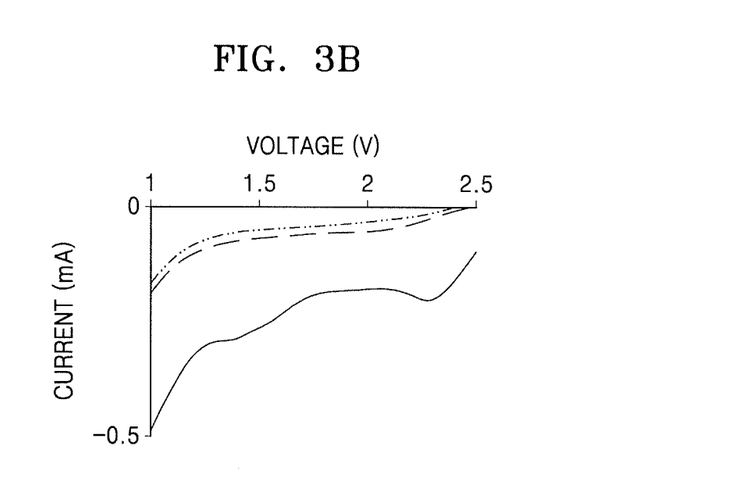
Figure 4A:
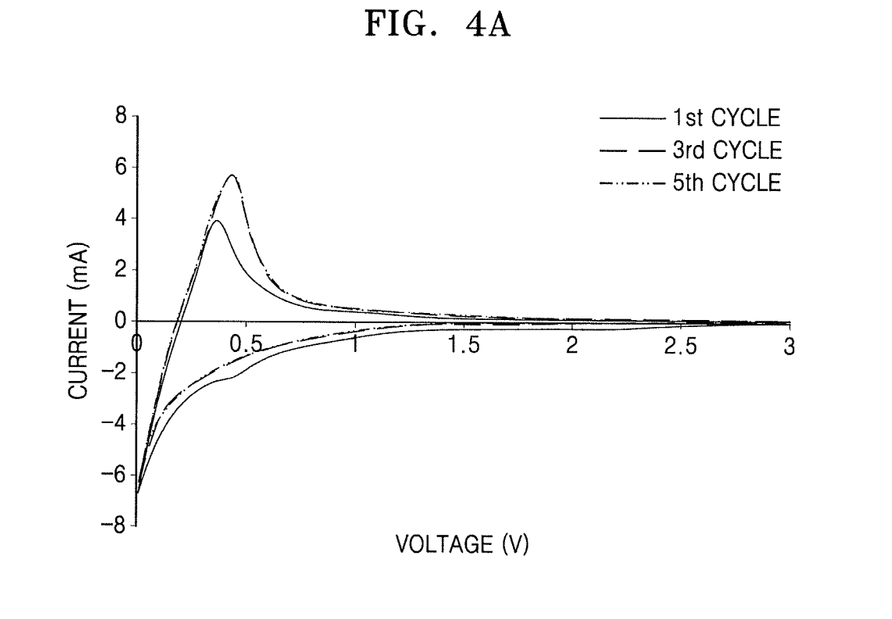
FIGS. 4A and 4B illustrate graphs showing CV analysis results of an anode using an electrolyte prepared according to Example 2.
Figure 4B:
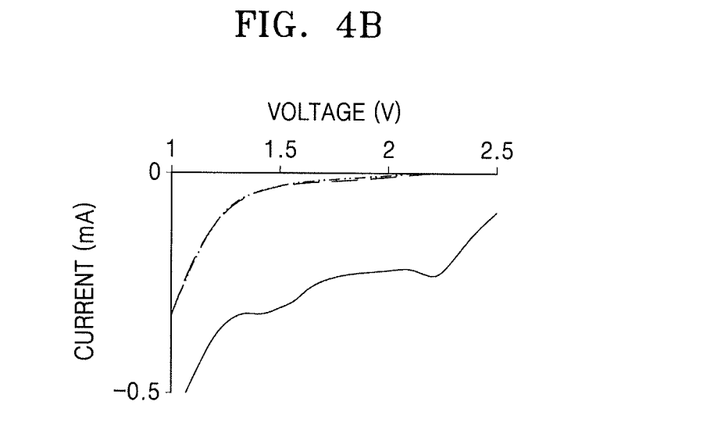
Figure 5A:
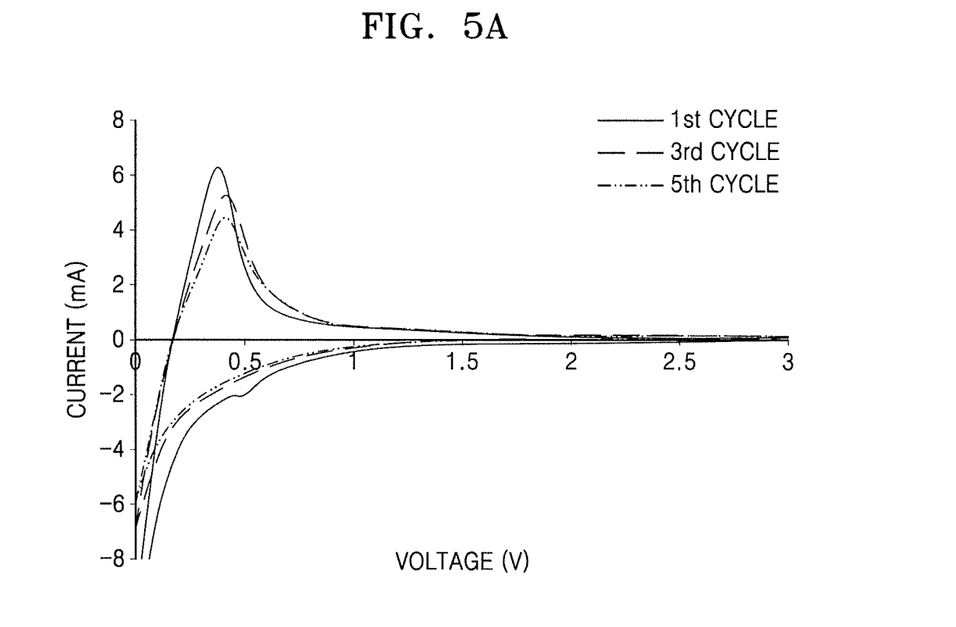
FIGS. 5A and 5B illustrate graphs showing CV analysis results of an anode using an electrolyte prepared according to Comparative Example 1.
Figure 5B:
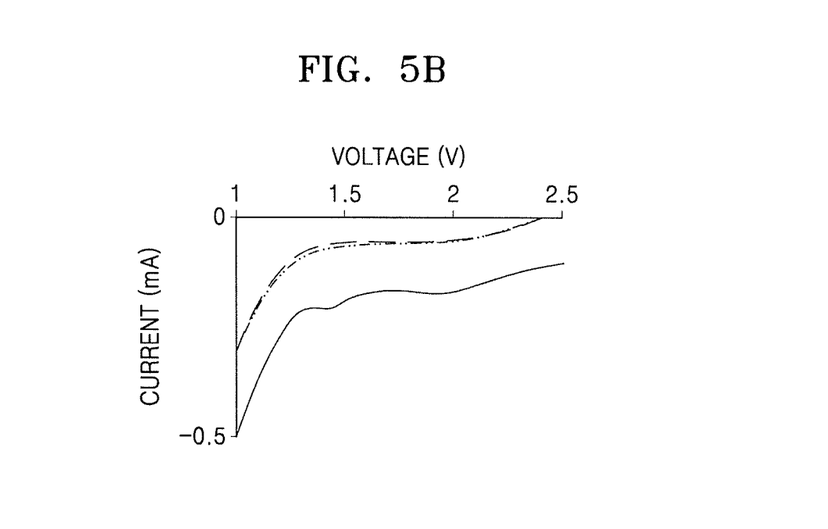

Electrochemical stability of each of the electrolytes of Examples 1 and 2 and Comparative Example 1 was evaluated using the following method. To perform CV on an anode, graphite as a working electrode (W.E.), a Li metal as a counter electrode (CE), and a Li metal as a reference electrode (R.E.) were used and each of the electrolytes of Example 1 and Comparative Example 1 was injected thereinto, thereby completing the manufacture of a three-electrode system cell. The electrochemical stability was measured by CV at a scan rate of 1 mV/s from 3 V to 0 V. The electrochemical stability evaluation results are shown in FIGS. 3 to 5. FIGS. 3A and 3B illustrate CV analysis results of an anode using the electrolyte of Example 1. FIGS. 4A and 4B illustrate CV analysis results of an anode using the electrolyte of Example 2. FIGS. 5A and 5B illustrate CV analysis results of an anode using the electrolyte of Comparative Example 1. FIGS. 3B, 4B and 5B are enlarged views of changes in current in a voltage region of 1 V to 2.5 V in graphs of FIGS. 3A, 4A and 5A, respectively.

As illustrated in FIGS. 5A and 5B, the electrolyte of Comparative Example 1 had an ethylene carbonate (EC) reduction peak at about 0.5 V in a $1^{st}$ cycle. In addition, a considerable and continuous decrease in current was observed in $2^{nd}$ and $3^{rd}$ after $1^{st}$ cycle (e.g. in $3^{rd}$ and $5^{th}$ cycles). From the results, it may be seen that resistance increased due to the growth of a SEI layer as a cycle of charging and discharging proceeded.

By contrast, as illustrated in FIGS. 3A, 3B, 4A and 4B, it may be seen that the electrolytes of Examples 1 and 2 showed more stable cycling ($3^{rd}$ and $5^{th}$ cycling curves are closer to each other than for the electrolyte of Comparative Example 1 in FIGS. 5A and 5B), the effect being more pronounced for the electrolyte of Examples 2, where the $3^{rd}$ and $5^{th}$ cycling curves almost coincide with each other. Moreover, for the Example 2 lithium deintercalation current after the $1^{st}$ cycle got much higher, indicating more conductive layer was formed. Also, pronounced reduction peaks at around 2.2-2.3V in the $1^{st}$ cycling curves of the electrolytes of Examples 1 and 2 in FIGS. 3B and 4B (in contrast, absent for Comparative Example 1 in FIG. 5B) indicate reductive decomposition of the additive before that of EC with the participation of reduction products in the formation of a stable SEI layer on anode.

From the result, it may be seen that the compound of Formula 3 included in the electrolyte of Example 1 and the compound of Formula 4 included in the electrolyte of Example 2 acted as electrolyte additives forming stable SEI layer at an anode. Among the electrolyte additives described above, the compound of Formula 4 may be an effective electrolyte additive.

The compound of Formula 3 and the compound of Formula 4 may participate in forming, through an interaction between isocyanate groups of the respective compounds and hydroxyl groups at a surface of silicon or carbon of an anode as well as through a reductive electrochemical decomposition, a stable, efficient SEI layer on the anode, whereby a lithium battery with enhanced cycle lifespan may be obtained.

By way of summation and review, when a carbonate-based solvent is used as the organic solvent, side reactions between the anode (and/or the cathode) and the electrolyte solution could occur during initial charging, and could consequently lead to an irreversible reaction that uses an excess of charge. The irreversible reaction could result in formation of a passivation layer, such as a solid-electrolyte interphase (SEI) layer, on the surface of the anode. The SEI layer may prevent or reduce further decomposition of the electrolyte and may also serve as an ion channel. The higher the stability of the SEI layer and the lower the resistance of the SEI layer, the longer the lithium battery life may be.

A variety of electrolyte additives may be used to stabilize the SEI layer. However, SEI layers formed using some additives may be prone to deterioration at high temperatures. For example, the SEI layers may have reduced stability at high temperatures. An electrolyte that can form an SEI layer having improved stability at high temperature may be desirable.

As is apparent from the foregoing description, when an electrolyte for a lithium battery, according to an embodiment is used, a lithium battery may be manufactured in which lifespan characteristics are enhanced and an increase in cell resistance is suppressed at a high temperature and room temperature.

The embodiments may provide electrolytes for lithium batteries which have enhanced lifespan characteristics at a high temperature and lithium batteries including the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. An electrolyte for a lithium battery, the electrolyte comprising a compound represented by Formula 1 below:

<Formula 1> wherein, in Formula 1,
n is 0 or 1,
when n=0, $R_2$ is a substituted or unsubstituted $C_2$-$C_{10}$ alkenyl group and $R_1$ is a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group; and
when n=1, $R_1$ to $R_4$ are each independently a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group.

2. The electrolyte as claimed in claim 1, wherein the compound of Formula 1 is a compound represented by Formula 2 below:

<Formula 2> wherein, in Formula 2, $R_1$ is a $C_1$-$C_5$ alkyl group.

3. The electrolyte as claimed in claim 1, wherein the compound of Formula 1 is a compound represented by Formula 3 or 4 below:

<Formula 3>

<Formula 4>

4. The electrolyte as claimed in claim 1, wherein the compound of Formula 1 is included in the electrolyte in an amount of about 0.001 wt % to about 10 wt %, based on a total weight of the electrolyte.

5. The electrolyte as claimed in claim 1, wherein the compound of Formula 1 is included in the electrolyte in an amount of about 0.05 wt % to about 0.2 wt %, based on a total weight of the electrolyte.

6. The electrolyte as claimed in claim 1, further comprising an organic solvent, wherein the organic solvent includes a dialkyl carbonate, a cyclic carbonate, a linear or cyclic ester, a linear or cyclic amide, an aliphatic nitrile, or a linear or cyclic ether.

7. The electrolyte as claimed in claim 1, further comprising a lithium salt, wherein the lithium salt is $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ in which x and y are each independently 1 to 20, LiCl, LiI, or a mixture thereof.

8. A lithium battery, comprising:
a cathode;
an anode; and
at least one selected from an electrolyte comprising a compound represented by Formula 1 below and a reaction product thereof:

<Formula 1> wherein, in Formula 1,
n is 0 or 1,
when n=0, $R_2$ is a substituted or unsubstituted $C_2$-$C_{10}$ alkenyl group and $R_1$ is a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group; and
when n=1, each of $R_1$ to $R_4$ is independently a substituted or unsubstituted $C_1$-$C_5$ alkyl group, a substituted or unsubstituted $C_6$-$C_{10}$ aryl group, or a substituted or unsubstituted $C_3$-$C_{20}$ heteroaryl group.

9. The lithium battery as claimed in claim 8, wherein the cathode includes a lithium-nickel composite compound that contains nickel in an amount of about 50 mol % to about 100 mol %, based on a total weight of transition metals in the lithium-nickel composite compound.

10. The lithium battery as claimed in claim 9, wherein the lithium-nickel composite compound is represented by Formula 6 below:

$Li_xNi_yM_{1-y}O_2$ <Formula 6> wherein, in Formula 6, x is 0.9 to 1.2, y is 0.5 to 1.0, and M is cobalt (Co), manganese (Mn), or aluminum (Al).

11. The lithium battery as claimed in claim 10, wherein the compound of Formula 6 is a compound represented by Formula 7 below or a compound represented by Formula 8 below:

$Li_xNi_yCo_zMn_{1-y-z}O_2$ <Formula 7> wherein, in Formula 7, 1≤x≤1.2, 0.5≤y<1, 0≤z≤0.5, and 0≤1-y-z≤0.5,

$Li_xNi_yCo_zAl_{1-y-z}O_2$ <Formula 8> wherein, in Formula 8, 0.5≤y≤1 and 0≤z≤0.5.

12. The lithium battery as claimed in claim 10, wherein the compound of Formula 6 is $LiNi_{0.6}Co_{0.2}Mn_{0.2}O_2$, $LiNi_{0.88}Co_{0.1}Al_{0.02}O_2$, or a mixture thereof.

13. The lithium battery as claimed in claim 8, wherein the compound of Formula 1 is a compound represented by Formula 2 below:

<Formula 2> wherein, in Formula 2, $R_1$ is a $C_1$-$C_5$ alkyl group.

14. The lithium battery as claimed in claim 8, wherein the compound of Formula 1 is a compound represented by Formula 3 or 4 below:

<Formula 3>

<Formula 4>

15. The lithium battery as claimed in claim 8, wherein the compound of Formula 1 is included in the electrolyte in an amount of about 0.001 wt % to about 10 wt %, based on a total weight of the electrolyte.

16. The lithium battery as claimed in claim 8, wherein the compound of Formula 1 is included in the electrolyte in an amount of about 0.05 wt % to about 0.2 wt %, based on a total weight of the electrolyte.

17. The lithium battery as claimed in claim 8, wherein:
the electrolyte further includes an organic solvent, and
the organic solvent includes a dialkyl carbonate, a cyclic carbonate, a linear or cyclic ester, a linear or cyclic amide, an aliphatic nitrile, or a linear or cyclic ether.

18. The lithium battery as claimed in claim 8, wherein:
the electrolyte further includes a lithium salt, and
the lithium salt is $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ in which x and y are each independently 1 to 20, LiCl, LiI, or a mixture thereof.

\* \* \* \* \*